(12) United States Patent
Feng et al.

(10) Patent No.: US 9,000,673 B2
(45) Date of Patent: Apr. 7, 2015

(54) MULTI-CHANNEL TWO-STAGE CONTROLLABLE CONSTANT CURRENT SOURCE AND ILLUMINATION SOURCE

(71) Applicant: Virginia Tech Intellectual Properties, Inc., Blacksburg, VA (US)

(72) Inventors: Weiyi Feng, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 97 days.

(21) Appl. No.: 13/930,200

(22) Filed: Jun. 28, 2013

(65) Prior Publication Data

US 2013/0285565 A1     Oct. 31, 2013

Related U.S. Application Data

(63) Continuation-in-part of application No. 13/114,181, filed on May 24, 2011, now Pat. No. 8,598,807.

(60) Provisional application No. 61/347,958, filed on May 25, 2010.

(51) Int. Cl.
*H05B 33/08*     (2006.01)
*H02M 3/335*    (2006.01)

(52) U.S. Cl.
CPC ........... *H05B 33/0839* (2013.01); *H02M 3/335* (2013.01); *H05B 33/0815* (2013.01); *H05B 33/0851* (2013.01); *Y02B 20/347* (2013.01)

(58) Field of Classification Search
USPC .................................. 315/186–193; 323/267
See application file for complete search history.

(56) References Cited

U.S. PATENT DOCUMENTS

| | | | |
|---|---|---|---|
| 8,120,278 B2 | 2/2012 | Choi et al. | |
| 8,390,214 B2 | 3/2013 | Van Laanen et al. | |
| 2010/0052568 A1 | 3/2010 | Cohen | |
| 2012/0007512 A1 | 1/2012 | Kim et al. | |
| 2012/0112649 A1 | 5/2012 | Shimura | |
| 2012/0286678 A1 | 11/2012 | Wu et al. | |

*Primary Examiner* — Tung X Le
*Assistant Examiner* — Jonathan Cooper
(74) *Attorney, Agent, or Firm* — Whitham Curtis Christofferson & Cook, PC

(57) ABSTRACT

A multi-channel constant current source particularly suitable for driving an array of light-emitting diodes as an illumination apparatus provides a power source stage voltage regulator for providing a variable voltage using pulse width modulation as an input to a plurality of constant current driver channels to regulate the constant current provided. Pulse width modulation thus allows both the power source stage and the constant current driver operating frequencies to be decoupled and individually optimized to maintain efficiency while emulating dimming effects of, for example, incandescent bulbs, over a full range of light output flux. Pulse width modulation can also be employed in the constant current channel drivers to avoid chromaticity shift during dimming.

21 Claims, 16 Drawing Sheets

MULTI-CHANNEL TWO-STAGE CONTROLLABLE CONSTANT CURRENT SOURCE AND ILLUMINATION SOURCE

CROSS-REFERENCE TO RELATED APPLICATIONS

This application is a continuation-in-part of U.S. patent application Ser. No. 13/114,181, filed May 24, 2011, which is hereby incorporated by reference in its entirety and priority of which as to all common subject matter is hereby claimed. U.S. patent application Ser. No. 13/114,181 claims priority of the filing date of U.S. Provisional Patent Application Ser. No. 61/347,958, filed May 25, 2010, which is also hereby fully incorporated by reference and priority as to common subject matter is also claimed.

FIELD OF THE INVENTION

The present invention generally relates to constant current power supplies and, more particularly, constant current power supplies for driving light emitting diode (LED) arrays for variable illumination in which the LEDs are connected in serial strings and driven with high efficiency.

BACKGROUND OF THE INVENTION

Since the development of the incandescent lamp, more efficient illumination devices have constantly been sought, along with qualities of improved light output spectrum, durability and useful lifetime. While the incandescent lamp is highly versatile in that light output flux can be varied with simple control of the power applied thereto, the efficiency of conversion of input power to light output is notoriously poor and the spectrum of light output is much different from natural sunlight and varies with input power. Incandescent lamps also have a relatively short useable lifetime and are subject to being broken or rendered inoperative from even relatively small levels of impact or vibration.

Well-known fluorescent lamps provide much greater efficiency and useful lifetime but are generally of larger size and substantially fixed light output flux of generally poor spectral quality and may even be more delicate and subject to damage than incandescent lamps with the potential for release of toxic substances. Further, since fluorescent lamps are operated using a discharge in a gas, special power supplies, often of significant weight and/or bulk, are required.

In recent years, light emitting diodes (LEDs) have become a good candidate for general illumination as well as for use in selective displays and signaling. LEDs are highly efficient, of very long useful service life, extremely rugged and the spectral output for a given light output flux can be readily established by choice of the materials and/or construction of the LED. Moreover, individual LEDs and small arrays of LEDs can be driven at relatively low voltages from simple power sources such as batteries or very simple power converters that can thus be of very small size, particularly where the spectral content of the output light is not of particular importance. Further, small arrays can be configured to have good uniformity of light output flux over at least a small area; making LEDs a particularly good candidate for illumination lamps and backlighting of passive display panels (e.g. liquid crystal screens). LEDs also exhibit a faster response time when energized or de-energized and do not present any significant ecological hazard.

However, to meet more general illumination requirements such as indoor or outdoor lighting of spaces of significant size and backlighting of large scale display panels, very large arrays of LEDs must be used since the light output of an individual LED is relatively small. Further, for good stability of light spectral content and to preserve the long service life of LEDs, they must be driven with a substantially constant current. Such larger arrays of LEDs are thus usually constituted by a plurality of long, serially-connected strings of LEDs where the number of serially connected LEDs may range from several dozen to several hundred.

Since, in operation, a given LED will exhibit a forward voltage drop when a current sufficient to cause illumination is passed through it, such strings of LEDs generally require a high DC voltage equal to the sum of all the forward voltage drops in a serially connected string of LEDs. Further, since one failure mode of an LED is to fail in a shorted condition (where no significant forward voltage drop will occur even while current is passed therethrough) the voltage which must be applied to each serially connected string of LEDs may differ markedly between the serially connected strings which comprise a given array. Thus, power supplies for larger LED arrays suitable for illumination have generally required each serially connected string of LEDs to be driven by a separate constant current power supply (e.g. a constant current supply being provided for each string of LEDs). It can be readily appreciated that the need to drive a potentially large plurality of strings of LEDs with a separate and separately controlled power supply channel for each LED string with coordination of current levels between separate constant current sources can cause an LED driver to require substantial complexity, cost and bulk, even when power factor correction and front-end DC-to-DC converter can be provided in common for all channels. Further, the use of three stages in the power supply tends to compromise the efficiency of the combination of the LED array and driver even though the energy conversion efficiency of the LEDs may be very high. Additionally, to emulate incandescent lamps in regard to the capability of varying output light flux, it is necessary to control the current and voltage applied to LED strings used for illumination. Such a requirement for variable current and voltage, particularly a current and voltage which must be varied over a wide range, can also compromise efficiency, particularly in resonant converters, as well as being complicated by the number of series-connected LEDs in each string and the number of strings which are commonly driven.

SUMMARY OF THE INVENTION

It is therefore an object of the present invention to provide a power supply for driving strings of LEDs which is capable of operating at high efficiency while allowing variable voltage and current to be applied to LED strings.

It is another object of the invention to provide a high-efficiency, variable-voltage power supply capable of driving variable numbers of LED strings of different lengths or numbers of LEDs.

In order to accomplish these and other objects of the invention, a multi-channel constant current source having a plurality of channels comprising a power source stage providing a controllable regulated output voltage controllable by pulse width modulation at a first frequency, and a channel driver stage comprising a switching circuit connected to the output of said power source, a plurality of transformers equal in number to the number of channels and having primary windings connected to receive equal currents from said switching circuit, the transformers having magnetizing inductances and turns ratios which are substantially equal, and a plurality of constant current channel drivers equal in number to the number of channels, wherein said constant current channel drivers are operated at a second constant frequency and connected to a secondary winding of a respective one of said plurality of transformers. A series-connected string of light-emitting diodes (LEDs) can be connected to respective channels to provide an illumination apparatus of any size or shape.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
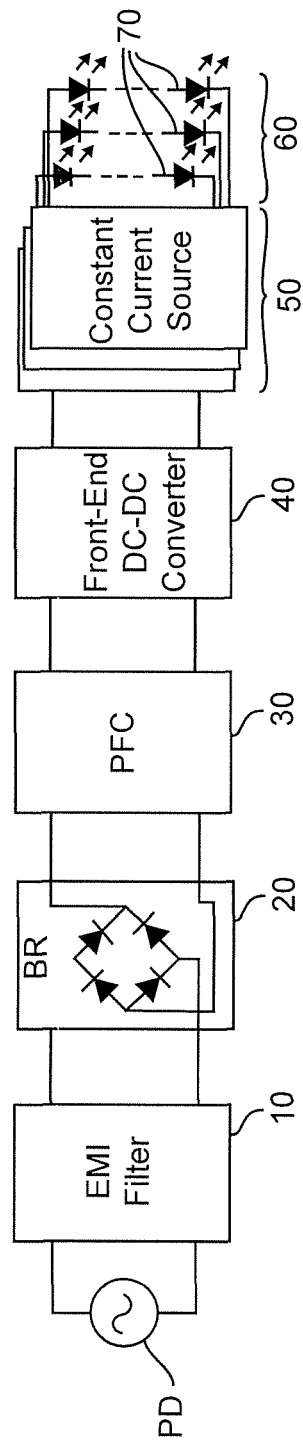
FIG. 1 is a high-level block diagram of a known architecture for a large LED array driver.
Figure 2:
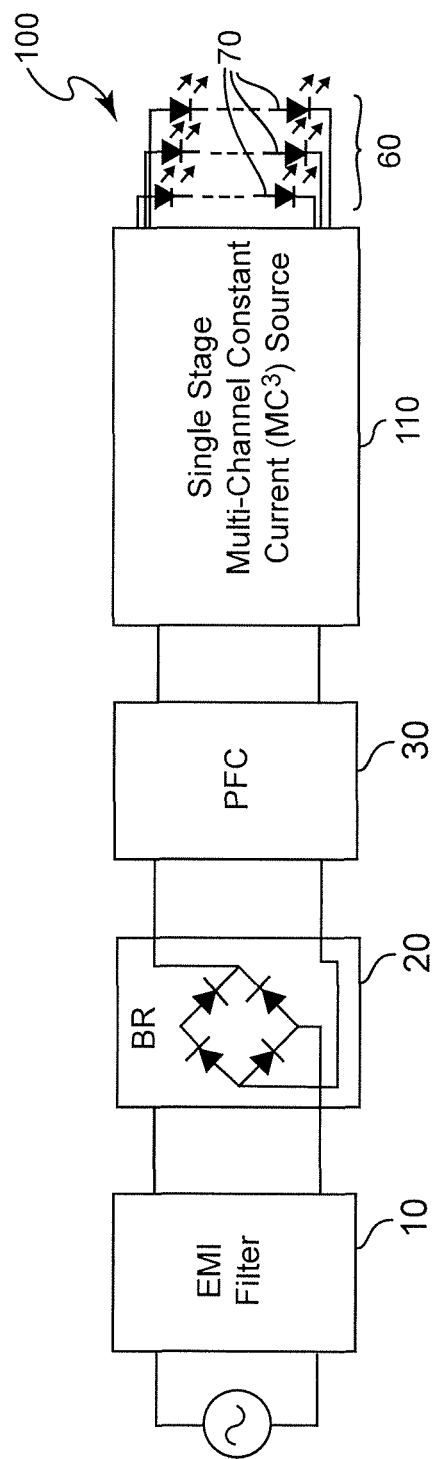
FIG. 2 is a high-level bock diagram of an architecture of the present invention.

Referring now to the drawings, and more particularly to FIG. 1, there is shown a high-level block diagram of a known architecture for an LED driver for a large LED array suitable for illumination (e.g. illumination of spaces of significant size, backlighting of large-scale display screens and the like). It is to be understood that FIG. 1 is arranged to convey an understanding of and appreciation for the basic principles of the invention and its meritorious effects as illustrated in FIG. 2. However, no portion of FIG. 1 is admitted to be prior art in regard to the present invention. It is also to be understood that references to LED arrays suitable for illumination or large LED arrays will refer to LED arrays including two or more strings, sometimes referred to as channels, of serially connected LEDs in which the number of LEDs in a given string can effectively differ (e.g. through design/fabrication or through failure of one or more diodes in any failure mode, including shorting) by two or more from the number of LEDs in another string.

The known architecture of a multi-channel constant current LED driver type power converter, as illustrated in FIG. 1, generally comprises an electromagnetic interference (EMI) filter 10, a rectifier 20, depicted as a full-wave bridge rectifier, a power factor correction circuit 30, a front-end DC-to-DC converter 40 and a plurality of constant current source circuits 50, one for each serially connected LED string 70 forming the LED array 60. The EMI filter 10 is required to avoid switching noise from the power converter or the load from being reflected into the power distribution system, PD, if power is derived from such a system, and, in any case, to reduce radiated high-frequency noise. Similarly, the power factor correction (PFC) circuit 30 is required to isolate the load and reduce the amount of current drawn from the source for a given amount of useful power delivered to a load; thus reducing distortion and raising the effective power factor of the load. The rectifier 20 is required simply to convert alternating current (AC) power used for power distribution to direct current (DC) power which is used to power both the load and the power converter. Thus, the rectifier 20 may be omitted if a DC power source is provided (as will be assumed in the illustration and following discussion of some embodiments of the invention and, in any case, the combination of any or all of the EMI filter 10, the PFC circuit 30 and the rectifier 20, if provided, may be considered as a single power supply stage).

The particulars of EMI filter 10, rectifier 20 and PFC circuit 30 are unimportant to an understanding of the invention or the practice of the invention in accordance with its basic principles and need not be further discussed although, as will be discussed in detail below in connection with FIG. 12, some particular types of PFC circuit may be advantageous for specific applications. In any case, it should be appreciated that at least the PFC circuit 30, the front-end DC-to-DC converter 40 and the controlled current sources 50 will necessarily exhibit some significant degree of inefficiency in each of these three stages; limiting the overall, combined efficiency to a greater degree than would occur with fewer stages of similar efficiency. It should also be appreciated that constant current sources 50 must not only be individually controlled but the control must be coordinated among the current sources such that substantially the same current will be delivered to each LED string 70.

Thus, as shown in FIG. 2, the architecture of the LED driver 100 in accordance with the invention replaces the combination of front-end DC-to-DC converter and the plurality of constant current sources 50 with a single stage multi-channel constant current source 110. Thus, a two-stage architecture is provided by the invention which is potentially more efficient than the three-stage architecture of FIG. 1. Moreover, rather than requiring coordinated individual control of multiple current sources 50, a single stage multi-channel constant current source in accordance with the invention can be much more simply controlled as a single stage and single circuit that it comprises.

Figure 3:
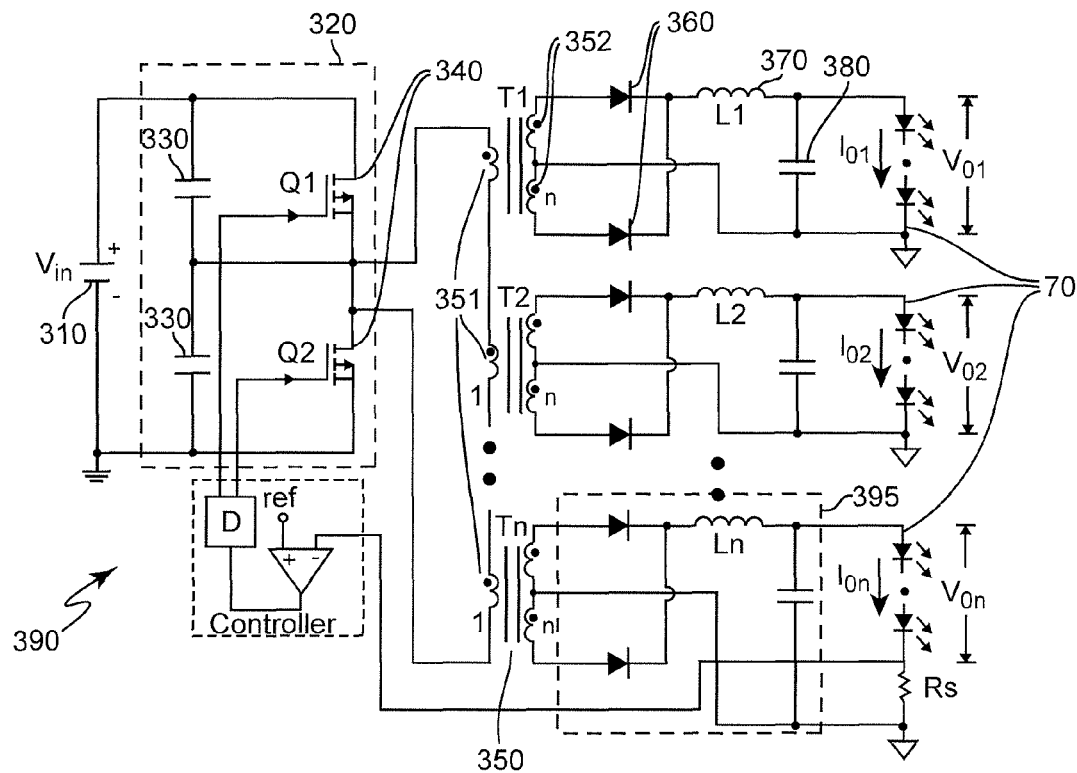
FIG. 3 is a schematic diagram of a basic embodiment of the present invention.

Referring now to FIG. 3, an exemplary embodiment of the invention is shown. As alluded to above, a DC power source 310 is assumed for simplicity and clarity of illustration but an AC power source and rectifier could be used, as described above. A traditional PFC circuit 320 comprising, for example capacitors 330 connected as a voltage divider and switches, Q1, Q2, (340) which are operated out of phase to be alternately conductive at a relatively high frequency (e.g. 300 KHz) to reverse the voltage ($V_{in}/2$) polarity applied across the serially connected primary windings 351 of transformers 350; one transformer 350 being provided for each channel corresponding to an LED string 70. Due to the high frequency switching provided by switches 340, transformers 350 may be formed by windings on toroidal cores that are very small and of low weight and volume as is the common practice in the art.

The secondary windings 352 of transformers 350 are preferably center-tapped windings that are connected to rectifiers 360, in this case, in a half-bridge circuit such that the diodes 360 will alternately conduct to supply current to inductor 370 and filter capacitor 380 to provide output current. Those skilled in the art will recognize the circuit topology of each channel as a buck converter which can operate as either a voltage regulator or a constant current supply depending on the manner in which it is driven by connection of input currents thereto in response to a monitored output. Other circuit topologies can also be used in accordance with the invention but the exemplary buck converter is chosen for illustration in the interest of simplicity and clarity. However, since the buck converter type topology is very simple and requires only a relatively few inexpensive components, it is generally preferred for most applications of the invention. Regardless of the topology employed or the components included, the basic elements thereof (e.g. rectifiers, inductor and filter as indicated by dashed line 395) will be collectively referred to as a channel driver since it is a driver constituted by a channel of a more extensive, unitary circuit, as distinct from the plurality of discrete current sources of FIG. 1.

In the multiple transformer arrangement in accordance with the invention, the primary windings of all transformers 350 are connected in series and thus the same current necessarily flows in each of the primary windings 351. This connection of the channels and constraint of identical primary winding current serves to couple the channels into a single, unitary multi-channel constant current source circuit. Assuming the magnetizing impedances of the transformers 350 are the same and the turns ratio is equal, the secondary side currents will, ideally, also be equal. Thus, a simple control strategy can be achieved in which the LED string current, Io(n), of only one channel need be monitored and controlled using, for example, a current sensing resistor Rs, an inductive sensor or the like to develop a voltage which is then fed back to control circuit 390 which controls the switching of switches 340. The remainder of the channels will thus be similarly controlled since the currents in primary windings 351 of all transformers 350 is the same as that for the channel which is directly monitored and controlled. This common control of all channels in accordance with the monitoring and control of a single channel is referred to hereinafter as current cross-regulation.

The particulars of the control circuit 390 are not important to the understanding or practice of the invention and suitable arrangements will be apparent to those skilled in the art. However, since the spectral content of light output by LEDs varies with LED string current, it is preferred that a degree of adjustability be provided by comparison of the voltage corresponding to the monitored LED string current to a reference voltage (ref) as schematically shown and the result of the comparison used to control a switch driver, D. Since only one such controller is needed in accordance with the preferred control strategy that the invention in accordance with its most basic principles allows, the cost, complexity and bulk of control circuitry is drastically reduced in the architecture of FIG. 2 as compared with that of FIG. 1. Further, by providing a single stage as a multiple channel constant current source (for a driver of two total stages), total efficiency of the LED driver in accordance with the invention is improved over the two-stage combination of a DC-to-DC converter 40 and multiple constant current sources 50 (resulting in a driver of three total stages).

It should be understood that the ideal operation of the multiple channel constant current circuit described above will only be closely approached in practical applications of the invention. In practical applications, the LED string voltages may differ from each other and will alter the constant current actually delivered to the respective LED strings 70 by the respective channels. Some divergence from ideal performance may derive from variations in the transformers or other circuit elements in the respective channels but such effects will generally be sufficiently small to be negligible. The principal reason that string voltages may significantly differ from each other is due to either differences in forward voltages of the individual LEDs in a given LED string (e.g. chip-to-chip variations in electrical characteristics) and the effective number of LEDs in a given string. That is, the number of LEDs in respective strings may differ by design and manufacture of the individual strings or one or more LEDs in a string may fail in a shorted mode (reducing the number of forward voltage drops across individual LEDs). Either or both of these possibilities will degrade the current cross-regulation of the multi-channel constant current source in accordance with the invention.

Figure 4:
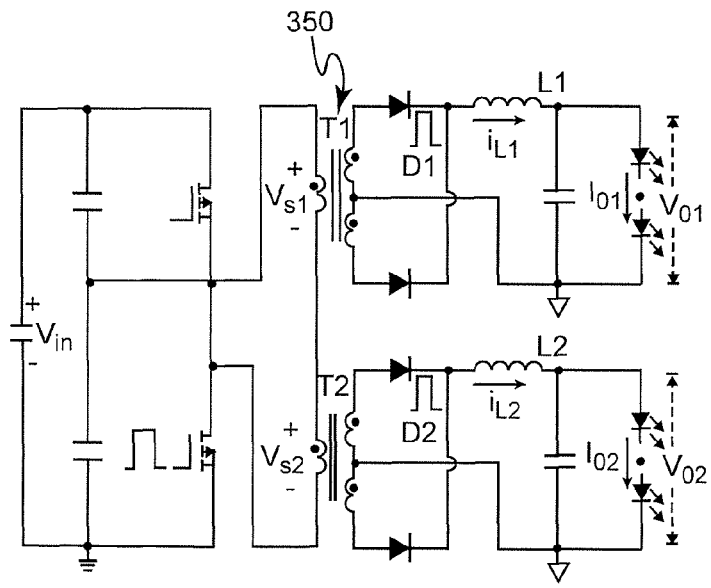
FIG. 4 is a schematic diagram of an exemplary two-channel constant current LED driver in accordance with the invention
Figure 5:
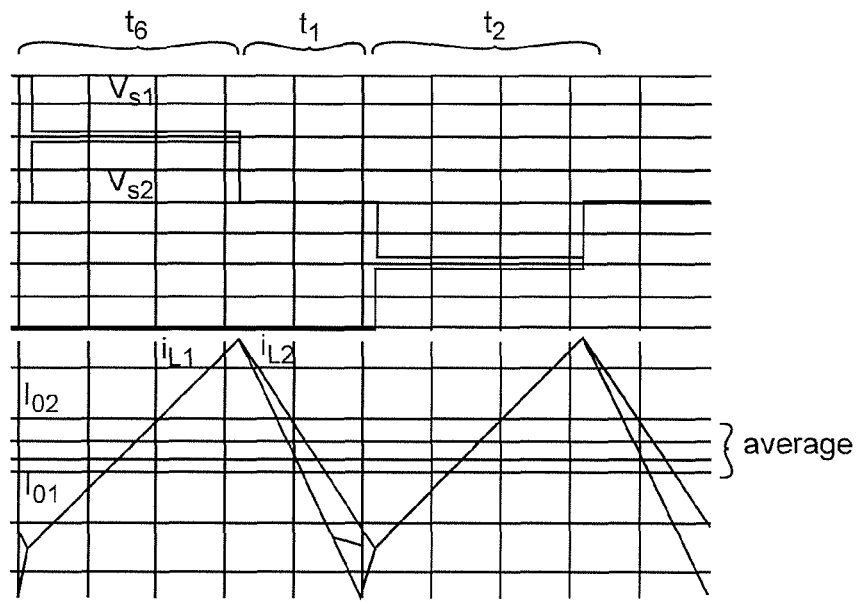
FIG. 5 is a graphical illustration of exemplary operational waveforms of the circuit of FIG. 4.

To understand why the LED string currents may significantly differ between LED strings, consider a two-channel constant current source as depicted in FIG. 4. The operating waveforms of the circuit of FIG. 4 are illustrated in FIG. 5. Assuming the LED strings are mismatched, (e.g. Vo1>Vo2), during the turn-on time, t0 or t2, of either primary side switch, T1 or T2, the transformer primary side currents are identical. Thus the secondary side currents (e.g. currents in inductors L1 and L2) are also substantially identical. However, during the turn off time t1 of both T1 and T2 (when neither switch is conductive) the slope of the decreasing current $i_{L1}$ and $i_{L2}$ in the respective inductors will differ due to the different voltages of the LED strings. Consequently, different voltages will be produced in the respective inductors, L1 and L2. When an input voltage is again applied to the serially connected primary windings, the entire voltage will first be effectively applied across the primary winding corresponding to the channel where the lower inductor voltage is present; causing the corresponding secondary side current of that channel and the voltage developed across the inductor to rise sharply in that channel until the inductor voltages in the respective channels are equal. (Conversely, the increasing primary side current cannot cause an increase in the inductor current in any channel until the secondary side transformer voltage exceeds the inductor voltage following the increase in secondary side inductor current in another channel. Thus the transformer appears, at the primary side, to be shorted with no voltage drop across the primary before the decreasing inductor current is exceeded because the current in the inductor is "free-wheeling" and developing a voltage that opposes the change in current.) As a consequence of current being supplied to one channel for a slightly longer duration than another channel, the average currents will slightly differ as shown in FIG. 5 and the spectral content of the light output by the LEDs or the respective strings will be altered accordingly. The alteration of spectral content may or may not be significant in a given application.

Figure 6:
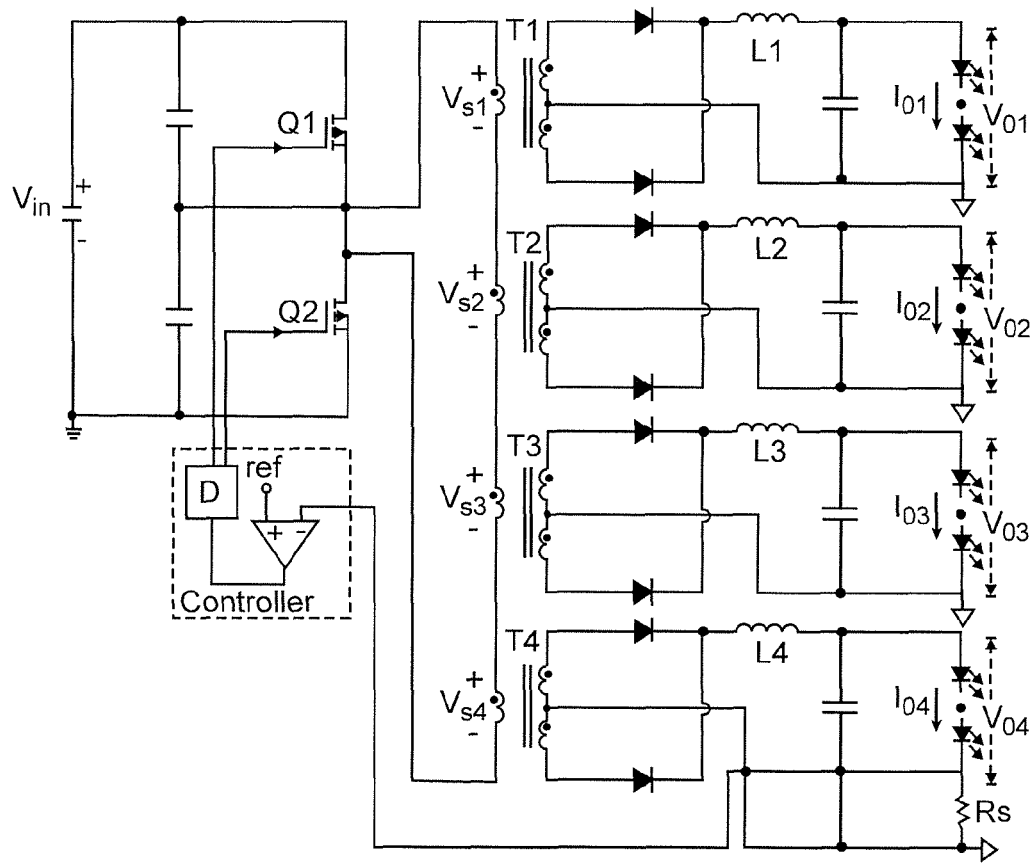
FIG. 6 is a schematic diagram of a four-channel constant current LED driver in accordance with the invention and used for simulation of the operation thereof.

To quantify this effect, the four channel constant current driver of FIG. 6 was simulated specifying mismatched and unbalanced LED strings. The number of LEDs in each string, the resulting string voltages, and the average currents resulting from the simulation are given in Table I.

TABLE I

| | No. of LEDs | Vo (V) | Io (mA) |
|---|---|---|---|
| String 1 | 15 | 55.1 | 701.8 |
| String 2 | 14 | 51.5 | 707.7 |
| String 3 | 13 | 47.9 | 713.7 |
| String 4 | 12 | 44.3 | 720.1 |

Figure 7:
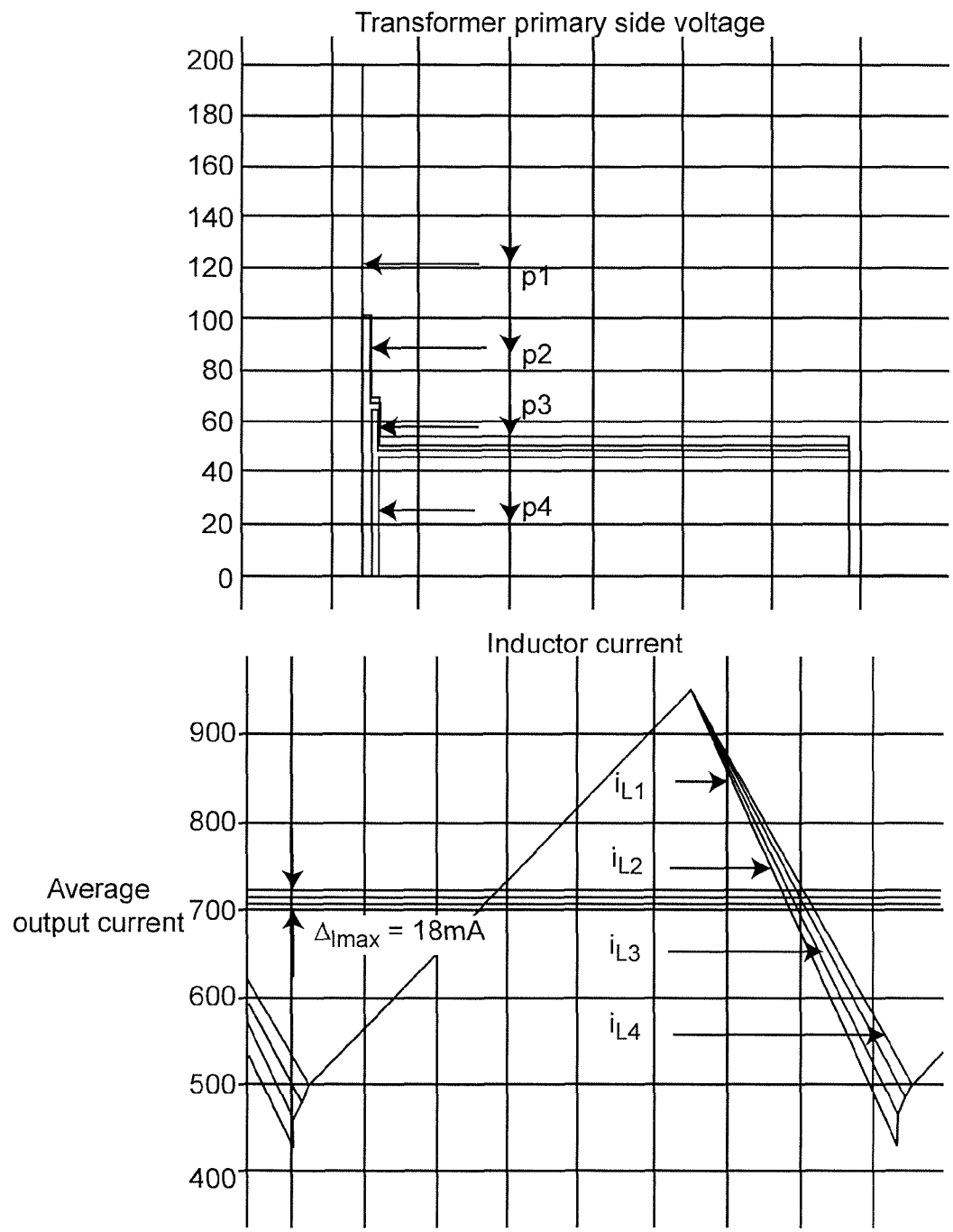
FIG. 7 illustrates simulation waveforms of the circuit of FIG. 6.

The simulation waveforms for the four-channel current source of FIG. 6 assuming an input voltage of 400v, a switching frequency of 300 KHz, an output inductance of 60 µH and a controlled LED string (LED string 4) current of 700 mA are shown in FIG. 7.

From FIG. 7 and Table I, it is clearly seen that while incremental changes in the number of LEDs can result in a nearly proportional change in the LED string voltage and that the different numbers of LEDs can result in substantial changes in LED string voltages, the change in average current between channels is relatively small. That is, comparing string 1 (15 LEDs—3.673 volts average LED voltage drop) and string 4 (12 LEDs—3.691 volts average LED voltage drop) yields a 10 volt (about 20%) variation in LED string voltage but only about a 2.5% variation in average current. Therefore cross-regulation provided by the invention is adequate for all but the most critical spectral content applications for reasonably comparable although unequal effective numbers of LEDs per string.

Figure 8A:
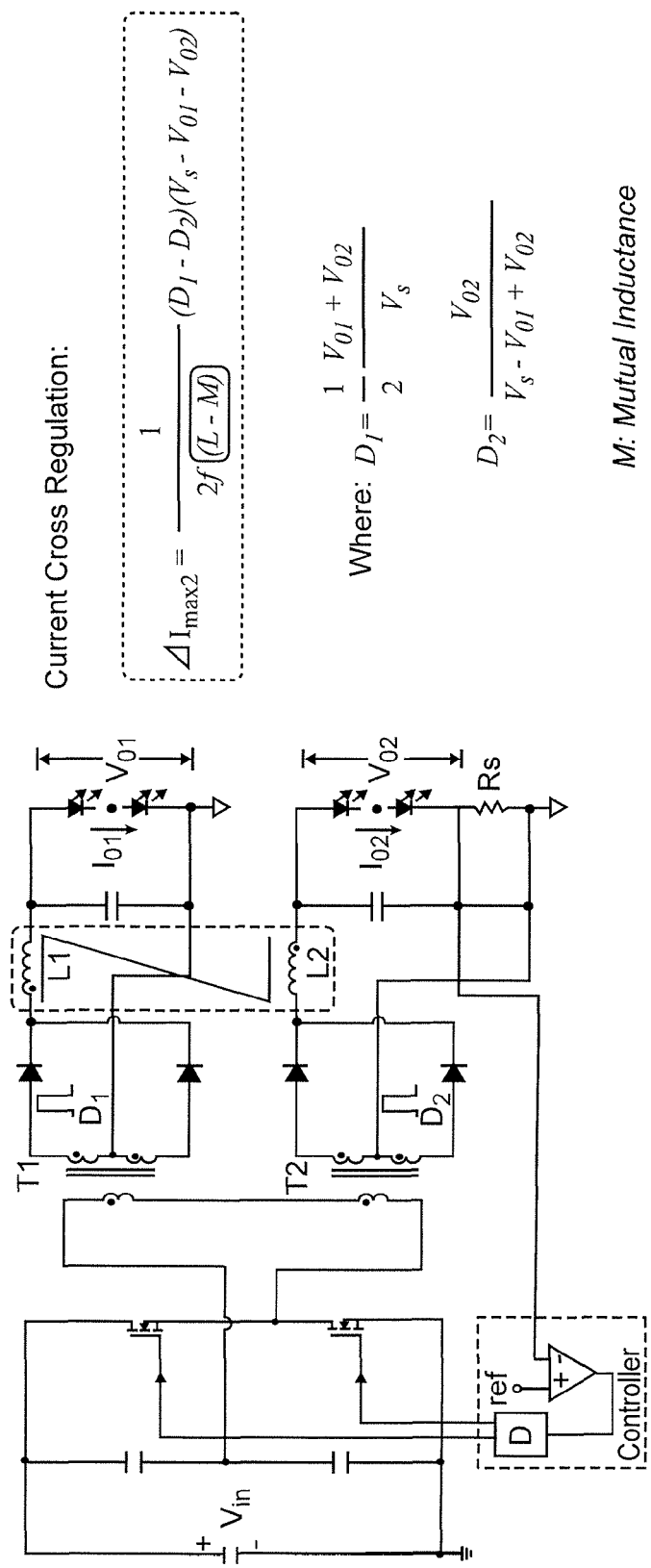
FIG. 8A is a schematic diagram of a two-channel embodiment of the invention including a perfecting feature thereof.
Figure 8B:
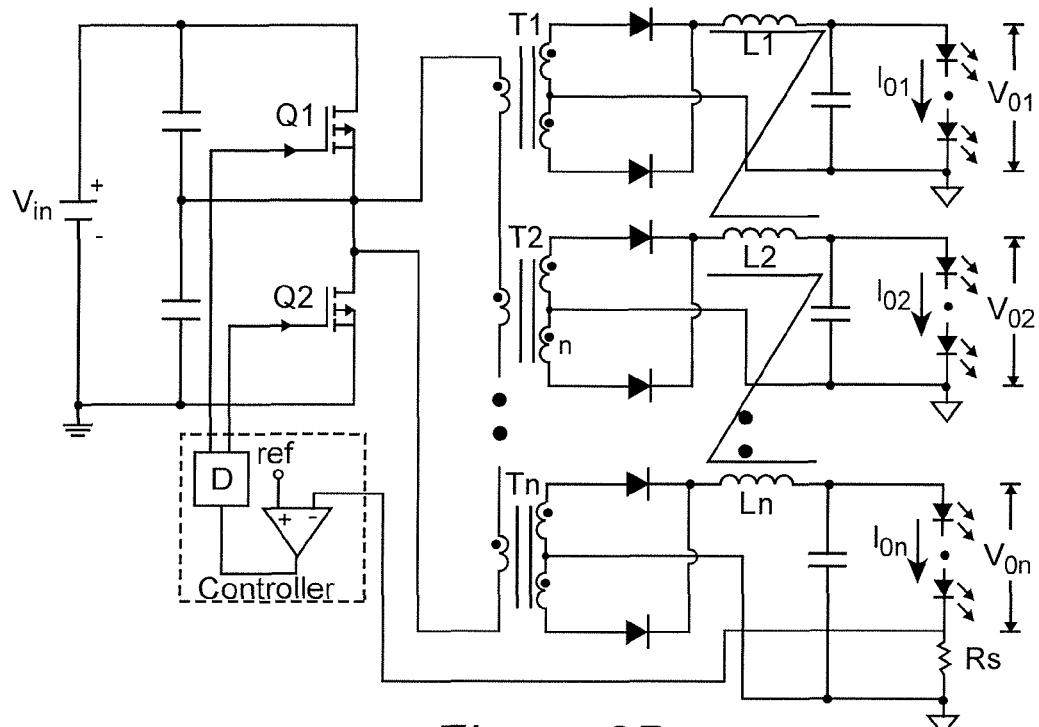
FIG. 8B is a schematic diagram illustrating the application of the perfecting feature of the invention to more than two channels.
Figure 9:
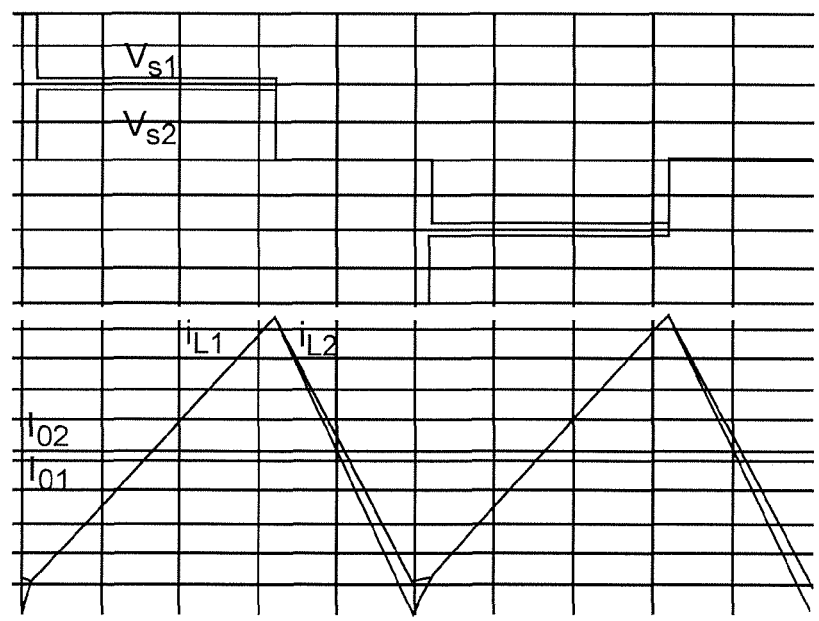
FIG. 9 is a graphical illustration of operational waveforms of the circuit of FIG. 8A

However, as a perfecting feature of the invention which is not critical to the successful practice thereof in accordance with its basic principles, the cross-regulation provided by the invention can be improved to 1.0% or less by providing inverse coupling between the inductors as depicted in the schematic diagram of FIG. 8A and the operational waveforms of FIG. 9. FIG. 8A differs from FIG. 4 only in the inverse coupling illustrated in FIG. 8A and which may be applied to any of the circuits illustrated in FIGS. 3, 4, 6 and 10-12. However, comparing the operational waveforms of FIG. 9 with those of FIG. 5 it can be seen that, depending on the degree of inverse coupling provided, the slopes of the decreasing current rates of the respective channels may be made very similar and the difference in conduction times and the differences of resulting average currents may be greatly reduced by forcing the inductor currents to follow each other even though the duty cycles (e.g. on-time) on the secondary side, D1 and D2, does not change. For the multi-channel case (e.g. where the number of channels is greater than 2), inverse coupling between channels as depicted in the schematic diagram of FIG. 8B will produce a similar effect.

As alluded to above, circuits having different topologies than the buck converter type topology illustrated can be used for the individual channels of the multi-channel constant current source of the invention as described above. The same general effects, properties and behaviors discussed above can be produced using other circuit topologies on the secondary side of the multi-channel constant current source as long as the respective channels each receive power through a transformer, the primary windings of the transformers are connected in series, the turns ratio of the transformers are equal and the magnetizing inductances of the transformers are approximately equal. Similarly, different circuit topologies other than the half-bridge input can be used on the primary side or both the primary and secondary sides of the multi-channel constant current source in accordance with the invention and may provide additional meritorious effects that may be particularly useful for some applications as will now be described with reference to three exemplary embodiments of the invention. Other variant topologies will be apparent to those skilled in the art from those which will be discussed below.

Figure 10:
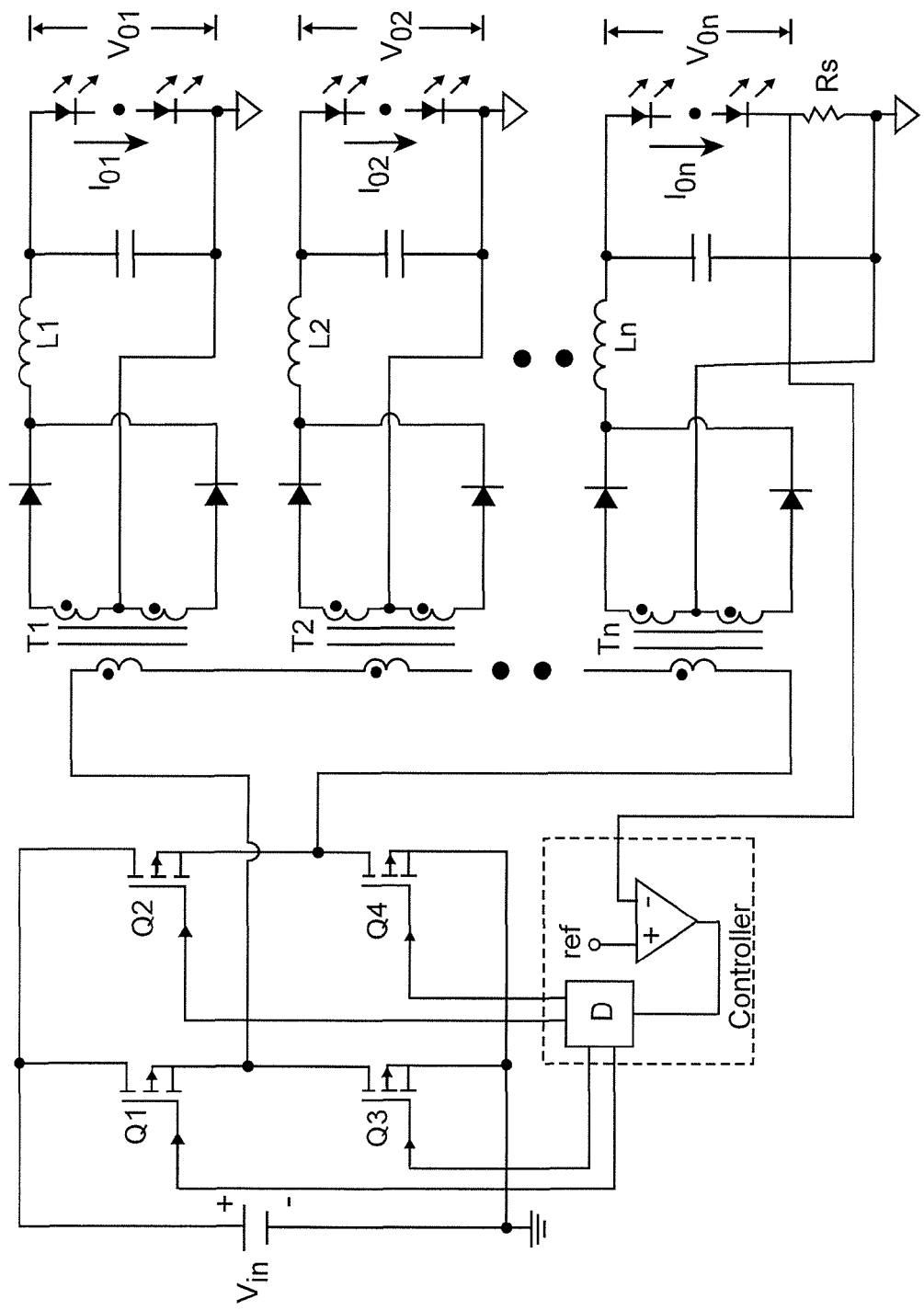
FIG. 10 is a schematic diagram of a preferred embodiment of the invention including a phase shift full bridge circuit.

Referring to FIG. 10, the input or primary side of the circuit of FIG. 3 has been replaced by a phase-shift full bridge network with a suitable switch driver as is known in the art. The secondary side and transformer connection is the same as that of FIG. 3 and inverse coupling to improve cross-regulation of current discussed above in connection with FIGS. 8A and/or 8B can be applied, if desired, although omitted from the illustration of FIG. 10.

The full bridge power input network is driven with switches Q1 and Q4 being conductive while Q2 and Q3 are non-conductive during a first time period and with Q2 and Q3 being conductive while Q1 and Q4 are non-conductive during a second time period. Such switching of the bridge network thus periodically reverses the polarity of Vin applied to the series connected primary windings of the transformers and no capacitive voltage divider (e.g. 330 of FIG. 3) is required. Therefore Vin can be a lower voltage for a given number of LEDs in the LED strings than was the case for the half-bridge power input circuit of FIG. 3. Further, if the switches of each pair of switches (e.g. Q1, Q4 and Q2, Q3) are operated slightly out of phase or with at least a short interval between the periods when the respective pairs of switches are conductive, the voltage in the bridge circuit can be brought to zero and soft switching can be achieved to further increase efficiency.

Figure 11:
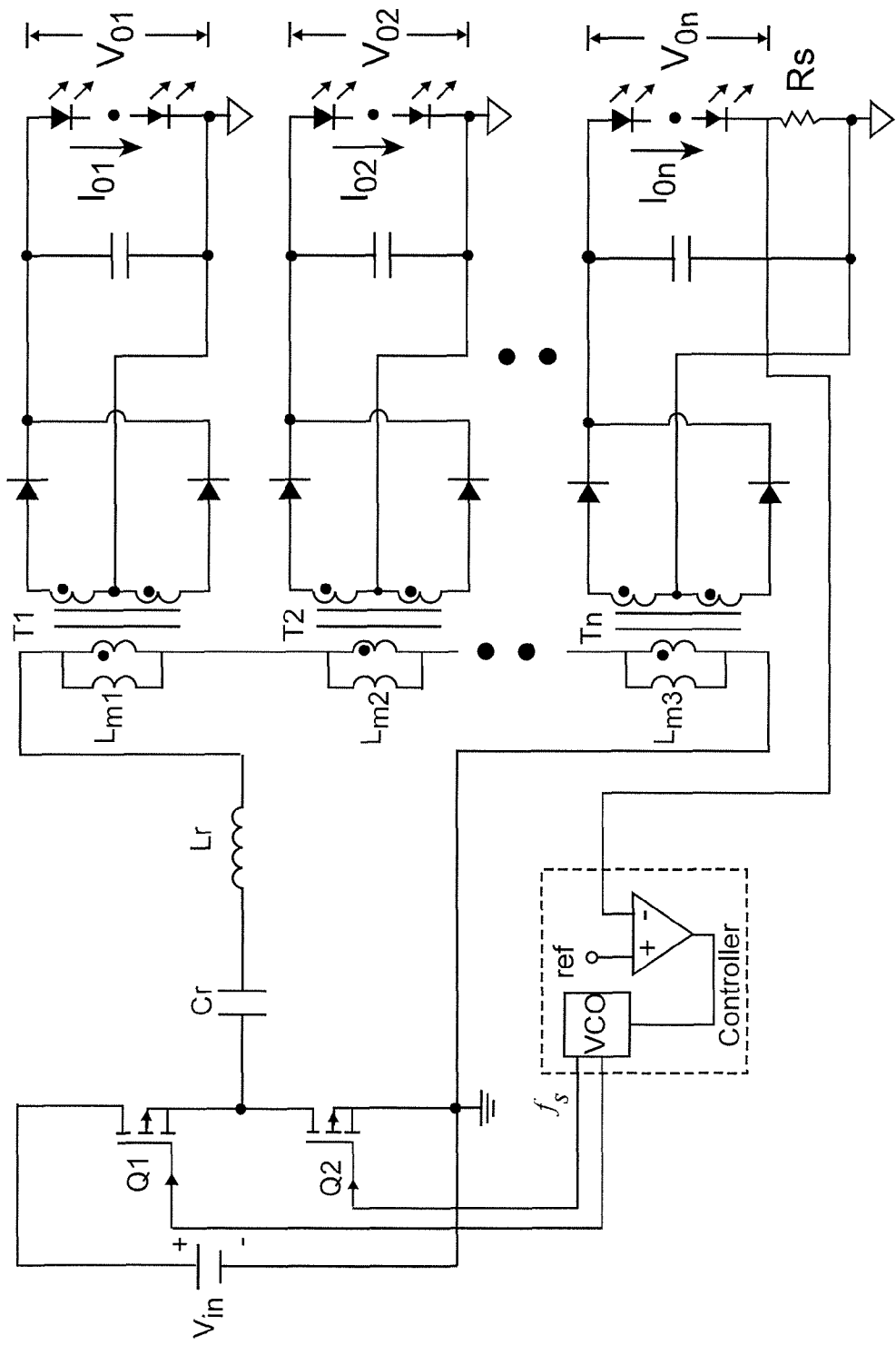
FIG. 11 is a schematic diagram of a preferred embodiment of the invention including a resonant type converter.

In the circuit of FIG. 11, a half-bridge power input circuit is provided but with an inductor, Lr, and capacitor, Cr, in series with the series connected transformer primary windings to form a resonant LLC circuit. When the switches Q1, Q2, are operated near the resonant frequency, a near sinusoidal waveform is produced and no capacitive voltage divider such as that of FIG. 3 is required. Monitoring and controlling current of only one channel with the current of the other channels controlled by cross-regulation is provided as described above. However, in this case, the controller 1110 includes a variable frequency oscillator (e.g. a voltage controlled oscillator (VCO)) to vary the switching frequency. Switch timing is also simplified and current control over a wide range can be more easily achieved with high efficiency since the peak voltage of the resonant waveform is highly sensitive to switching frequency. This circuit also provides the advantage of soft switching since the voltage waveform produced by the resonant circuit will fall to zero or near-zero when switching is to be performed. Magnetic integration of the LLC resonant circuit can also, desirably, reduce size, cost and weight and to increase power density.

Figure 12:
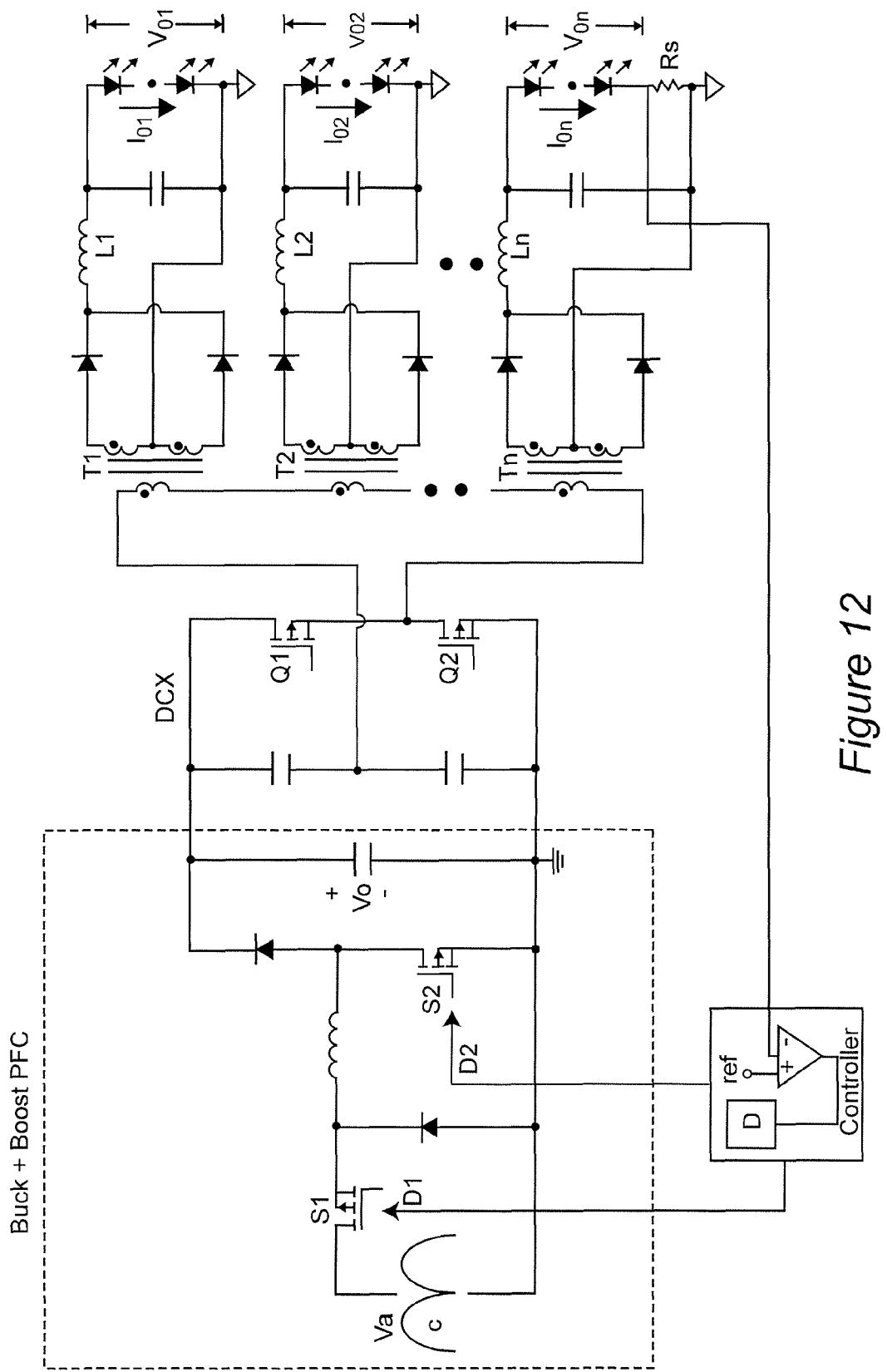
FIG. 12 is a schematic diagram of a preferred embodiment of the invention including a buck+boost PFC circuit cascaded with a half bridge bus converter.

FIG. 12 illustrates use of a buck+boost power factor correction circuit receiving input power as full-wave rectified AC power such as would be produced by a bridge rectifier 20 in FIG. 2. Those skilled in the art will recognize the combination of S1, D1 and the inductor as essentially a buck converter topology without a filter capacitor. As is known, a buck converter output voltage is necessarily less than the input voltage since the voltage developed on the inductor opposes the input voltage. Conversely, a boost converter output voltage is necessarily greater than the input voltage which is achieved by drawing a large current through the inductor to produce an increased intermittent voltage which is then rectified and filtered for application to a load. In the case of the buck+boost converter illustrated in FIG. 12, the addition of switch S2 allows manipulation of the inductor current of the buck converter topology such that a voltage either above or below the input voltage, Va, can be produced by appropriate control of both S1 and S2. For example, if S2 is maintained non-conductive, the circuit reduces to a simple buck converter and Vo<Va can be controlled entirely by S1. Conversely, conduction through S2 increases inductor current when S1 is conductive to produce an increased voltage on the inductor which is rectified and filtered by a bus converter (DCX) circuit when both S1 and S2 are turned off and the current in the inductor is "free-wheeling". The increase of inductor voltage can be readily controlled by the duty cycle of S2. Thus the buck+boost PFC circuit can provide an output voltage, Vo, that exceeds input waveform peak amplitude, Va, and the voltage Vo is readily controllable over a wide range that can be either greater or less than Va and which is sufficient for color control of the light output of the LED strings while still allowing monitoring and control of only a single channel with other channels cross-regulated (with or without inverse coupling as described above).

Returning briefly to FIG. 11 and the above description thereof, it was noted that an LLC resonant LED driver circuit was provided to enable soft switching, reduced electrical stress on switches (which can be operated to switch at near zero voltage and/or current) and increased efficiency and that the controller 1110 includes a voltage controlled oscillator (VCO). This type of arrangement is sufficient for control of spectral output of the LED and, to a degree, illumination light flux which both vary with LED forward voltage and current. However, as also alluded to above, it is desirable to provide for dimming or reduction of the illumination light flux over a wide range in order to emulate the capabilities of incandescent light sources that fluorescent light sources are incapable of providing. However, for an LLC resonant (or any other resonant converter topology) LED driver, when a wide range of controllable illumination light flux is required, the switching frequency must also be varied over a wide range of increasing switching frequency, reducing converter efficiency. For example, to achieve dimming of only 15% of full load illumination requires increase of the switching frequency of the resonant converter by a factor of ten; causing a dramatic loss of efficiency. Moreover, when the number of LED strings and the number of LEDs in the LED strings are changeable, as is highly desirable for increasing the range of applicability of a given commercial design for an LED illumination driver consistent with wide-range controllability of illumination light flux, the switching frequency range must be particularly large. Therefore, a given converter design cannot guarantee high or even acceptable efficiency under all potential operating conditions, particularly for an LED arrays of differing sizes.

Figure 13:
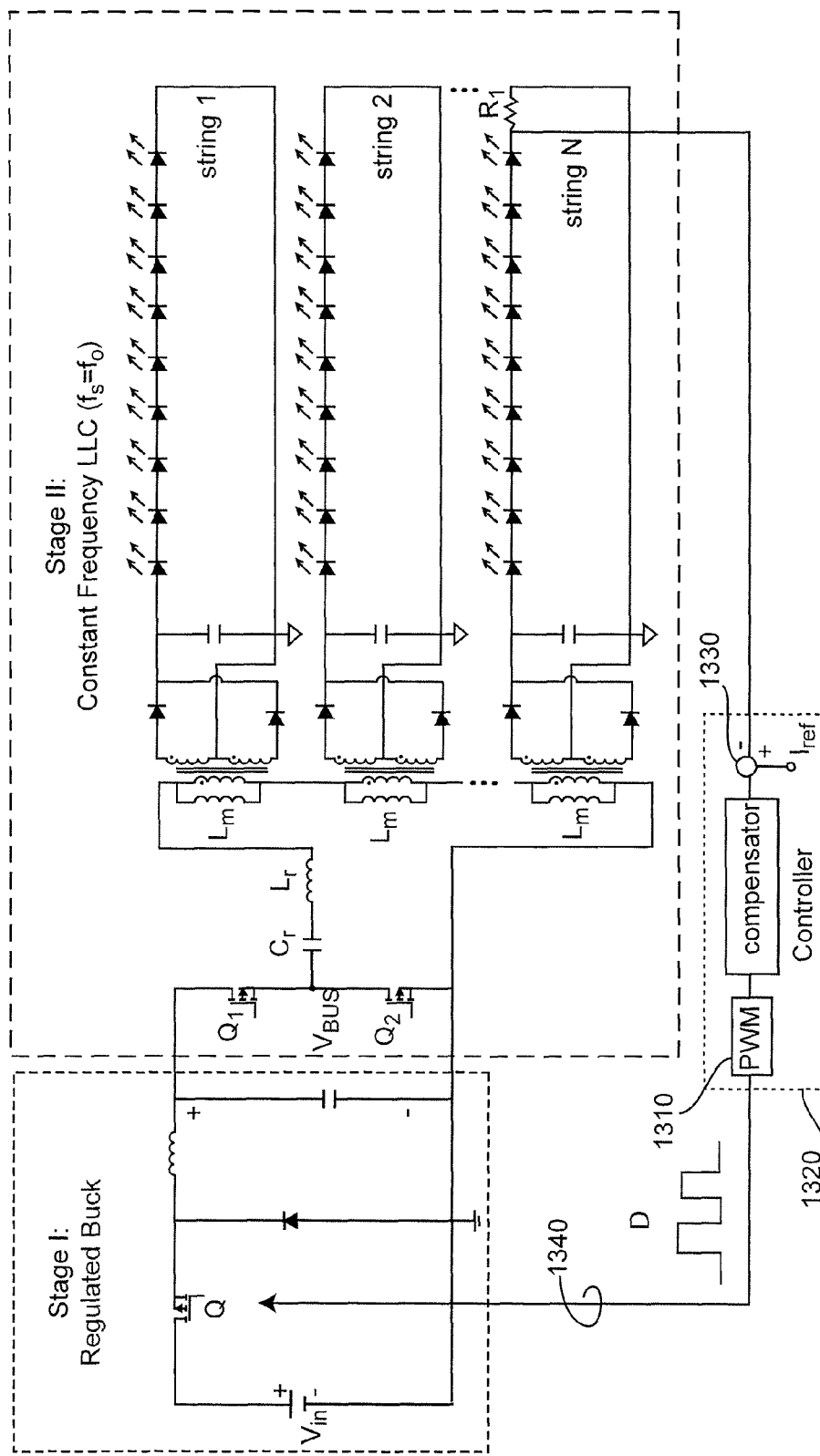
FIG. 13 is a schematic diagram of a preferred embodiment of a high-efficiency, variable-voltage driver and LED string arrangement for variable light flux illumination.

To solve these problems, a two-stage structure is provided in accordance with the invention; an exemplary embodiment of which is illustrated in FIG. 13. In this exemplary embodiment, the arrangement of FIG. 11 becomes the second stage of the converter and a regulated voltage converter such as a regulated buck converter provided as an input controllable voltage source. The regulated output voltage of the additional first stage can then be controlled, preferably at a constant frequency, by pulse width modulation (PWM) through a voltage controlled pulse width modulator 1310 in controller 1320. The resonant LLC second stage converter will then provide a voltage and constant current proportional to the controllable regulated output voltage of the first stage. Current sensing in any convenient channel can be provided for cross-regulation of current, with or without inverse coupling, as described above in connection with FIGS. 8A and 83. The voltage representing the sensed current can be compared with a reference (depicted as $I_{ref}$) with, for example, an adder 1330 having positive and negative inputs or any other circuit capable of voltage comparison. Thus, the second stage can be operated as a multi-channel controllable constant current source as described above that operates at a constant frequency at or close to the resonant frequency to maintain high efficiency with the current level being controllable over a wide range in accordance with the variable regulated output voltage $V_{BUS}$ of the first stage. Since the second stage is resonant, the switching duty cycle should be approximately 50% but sufficiently less than 50% to unconditionally prevent the switches Q1 and Q2 being concurrently conductive which would result in shorting of the output of the first stage. However, pulse width modulation of the second stage at duty cycles of significantly less than 50% may be useful in avoiding chromaticity shift during dimming as will be discussed in greater detail below. The switching frequency of the first stage is independent of the resonant operating frequency of the second stage and the switching frequency of each stage can be individually optimized for maximum efficiency and the switching frequency of the first stage can be altered as desired for the same purposes while the second stage operates at or close to the resonant frequency. Thus, while there is necessarily some small loss of efficiency due to the use of two converter stages, that loss of efficiency is negligible compared to the loss of efficiency that would be caused by operating the preferably resonant constant current stage over a wide range of frequencies required for even a small dimming effect while allowing a full range of dimming to be achieved. In practice, it is preferred at the present time and using a buck converter first stage, to operate the buck converter at approximately 100 KHZ and to operate the resonant converter at a frequency of 300 KHZ to 1 MHz with higher frequencies being preferred to reduce converter size. The only constraint on operating frequency is that the switching frequency of the converters must be above about 85 Hz to prevent visible flickering of the light flux since, as alluded to above, the response of LEDs is very rapid.

Figure 14:
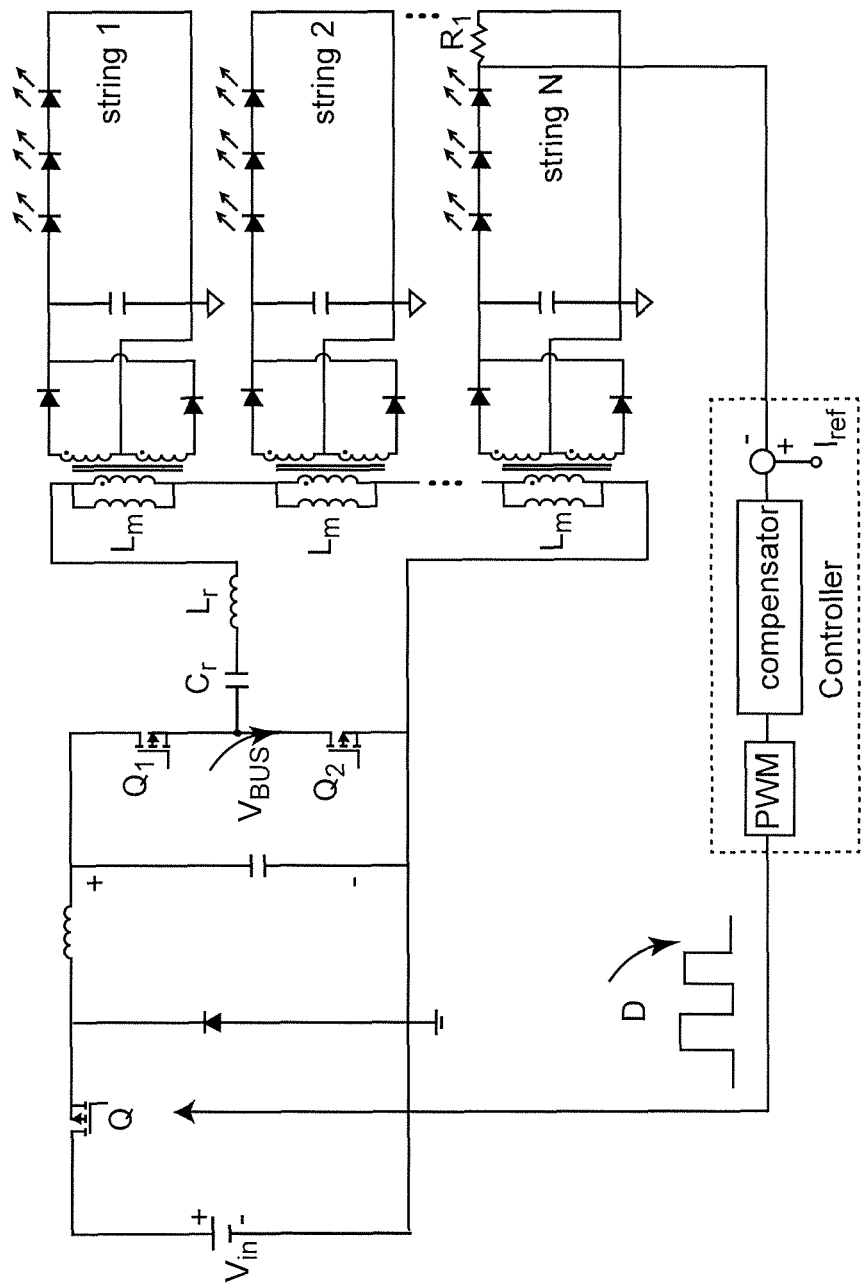
FIG. 14 is a schematic diagram of a driver circuit and LED illumination arrangement suitable for variable numbers of LEDs per LED string.

It should be noted that the above arrangement of FIG. 13 is also sufficient to accommodate a wide range of lengths of LED strings (e.g. the number of LEDs per string) while cross-regulation of current in LED strings containing different numbers of LEDs is performed as described above. That is, as depicted in FIG. 14, if the number of LEDs in the LED strings is reduced, $V_{BUS}$ can be correspondingly reduced by reduction of the duty cycle or pulse width, D, of the switching control signal 1340. Conversely, for longer LED strings, $V_{BUS}$ can be increased by increase of duty cycle or pulse width D of control signal 1340. This arrangement also accommodates variable numbers of LEDs in the respective strings such as may be caused by LED string design, failures of individual LEDs and the like.

Figure 15:
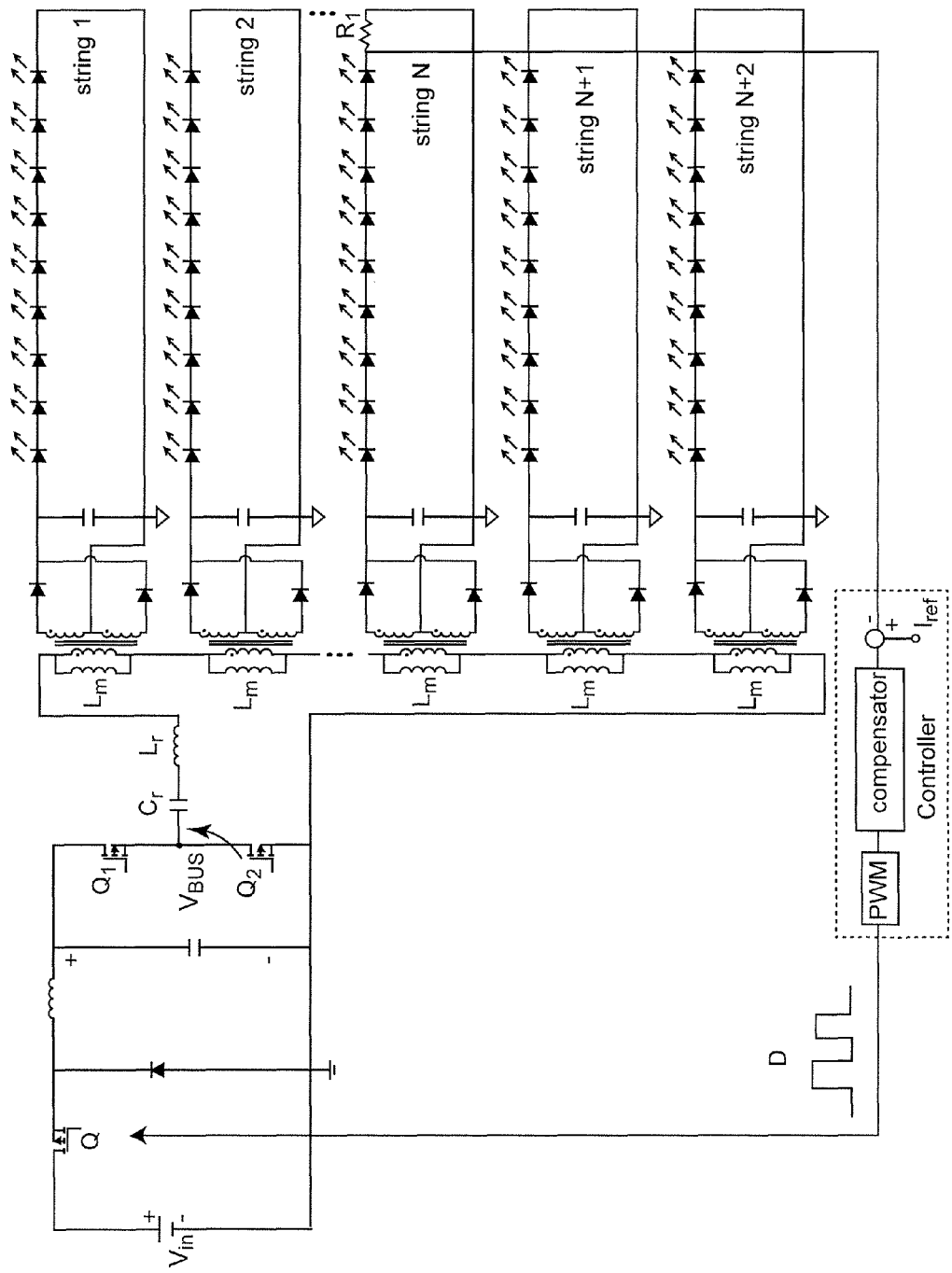
FIG. 15 is a schematic diagram of a driver circuit and LED illumination structure suitable for variable numbers of LED strings.

Similarly, as illustrated in FIG. 15, the above arrangement of FIG. 13 can accommodate an increased (or decreased) number of LED strings up to the maximum value of $V_{BUS}$ that can be provided from $V_{in}$ by a buck topology voltage regulator or regulator of any other topology. This capacity is important as it allows increased applicability of an LED driver of a given design. If the number of LED strings is further increased to require a $V_{BUS}$ voltage higher than can be derived from $V_{in}$ by known regulator topologies, a boost converter such as the buck-boost converter depicted in FIG. 16 can be employed.

Figure 16:
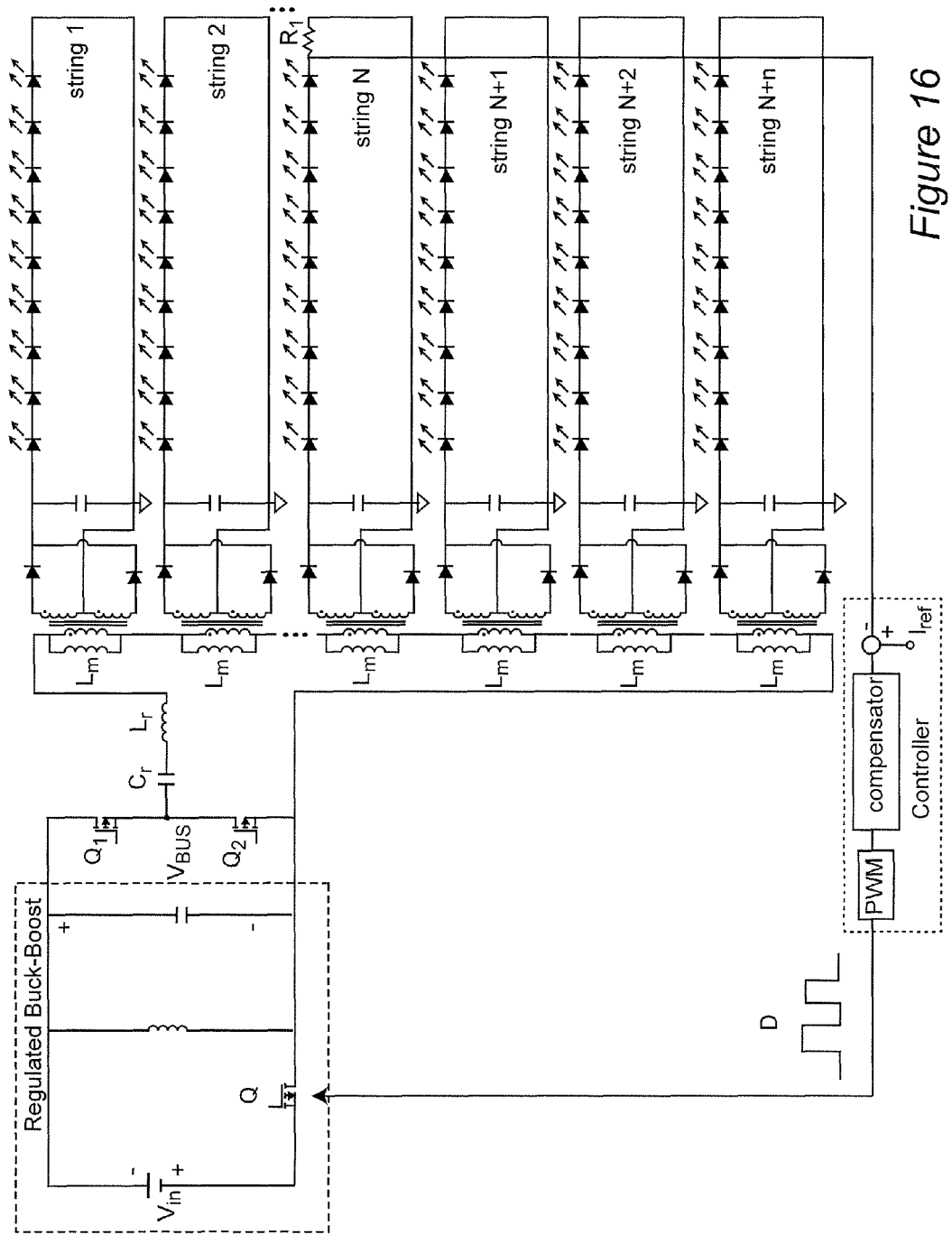
FIG. 16 is a schematic diagram of a driver circuit and LED illumination structure for increased numbers of LED strings.

In the buck-boost first stage of FIG. 16, transistor switch Q controls current through inductor L which develops a voltage that opposes the change in current when Q is conductive. When Q is then made non-conductive, the voltage across inductor L is added to the negative voltage, $-V_{in}$. Since the voltage developed across inductor L is a function of time (e.g. the period Q is conductive), the voltage developed is a function of the duty cycle, D. Thus, $V_{bus}=-DV_{in}/(1-D)$. When D is less than 0.5, the converter of FIG. 16 operates as a simple inverting buck converter with diode D (which could also be a transistor operated as a synchronous rectifier) supplies so-called free-wheel current to inductor L. When D is greater than 0.5, the additional voltage developed across inductor L is conducted through diode D to the filter capacitor which is charged to the voltage $V_{bus}$. Therefore, $V_{bus}$ can be regulated at any voltage by variation or adjustment of duty cycle, D. Of course, if it is known that $V_{BUS}$ will always be greater than $V_{in}$, a power source stage having a boost topology (e.g. without providing a buck function) can be used.

Figure 17A:
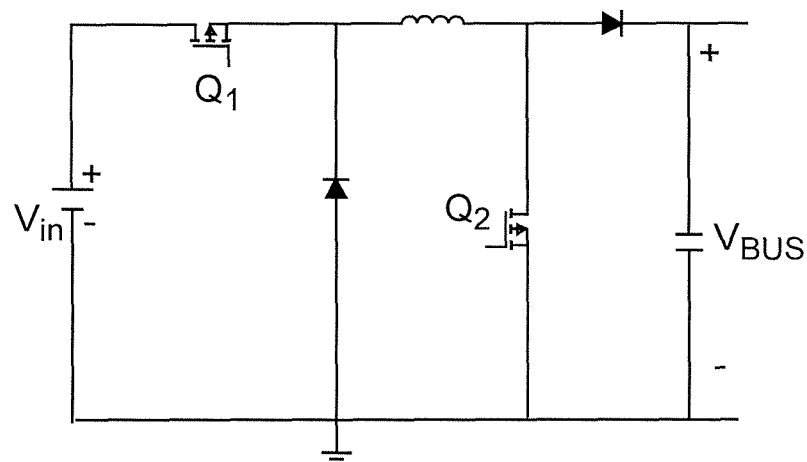
FIGS. 17A and 17B are schematic diagrams of additional alternative first stages of a driver circuit in accordance with the invention.
Figure 17B:
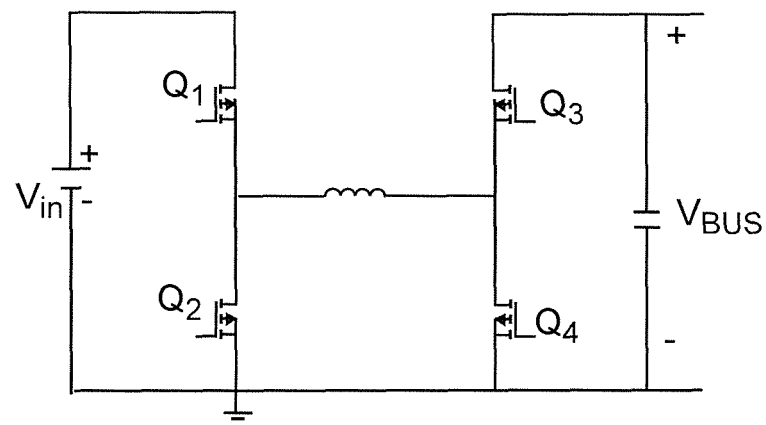

Other topologies such as the non-inverting buck-boost regulator of FIG. 17A or the four-switch buck-boost topology of FIG. 17B can be employed, as well, since both can regulate voltage over a very wide range. In the non-inverting buck-boost topology of FIG. 17A, Q2 can be maintained non-conductive to provide a well-known buck converter topology or can be turned on and off with Q1 maintained conductive to result in a well-known boost converter topology. Alternatively Q1 and Q2 can be driven oppositely such that Q1 is on while Q2 is off and vice-versa for a buck converter function or driven synchronously (e.g. both switches on or off) to provide a boost function. A transistor operated as a synchronous rectifier may be substituted for diode D to provide free-wheel current to the inductor in the buck mode. The voltage gain is $V_{bus}=DV_{in}/(1-D)$ and thus $V_{bus}$ can be either larger or smaller than $V_{in}$ as a function of D. Alternatively, any buck-boost topology or the like that can deliver $V_{bus}$ either greater or less than $V_{in}$ as described above can be employed for ever greater applicability of a given first stage design.

In the four-switch buck-boost converter of FIG. 17B switches Q1-Q4 are connected to an inductor L in a full bridge configuration. When switches pairs Q1 and Q2 are driven in a complementary manner with Q3 on and Q4 off, the circuit functions as a buck converter. Conversely, when switch pairs Q1-Q4 and Q2-Q3 are driven in a complementary manner, the circuit functions as a boost converter. The voltage gain is the same as for the non-inverting buck-boost converter of FIG. 17A and is also entirely a function of duty cycle. The topologies of FIGS. 17A and 17B have the disadvantage of requiring a change in switching patterns to change between buck and boost modes of operation but may be desirable in some applications.

Alternative topologies may also be used in the second stage that may provide advantages or economies in manufacture or use. In essence, any PWM or resonant type converter that can supply a constant but controllable current when operated at a constant frequency can be used as the second stage to maintain good efficiency even when current must be varied over a wide range. As a practical matter, resonant second stages are preferred for maximum efficiency since they can be operated with low switching losses and allow less electrical stress to be placed on the switches. However, PWM second stages may be preferred where spectral content is relatively critical since dimming can be performed by minimizing duty cycle while the rapid on/off operation maintains efficiency with no shift in chromaticity of the light output flux since the LEDs are operated at full light output while energized regardless of the brevity of energization in each PWM cycle. A controlled regulated voltage from the first stage can then be used to assert a degree of control of chromaticity by variation of voltage input to the second stage where dimming is controlled without further chromaticity shift.

Figure 18:
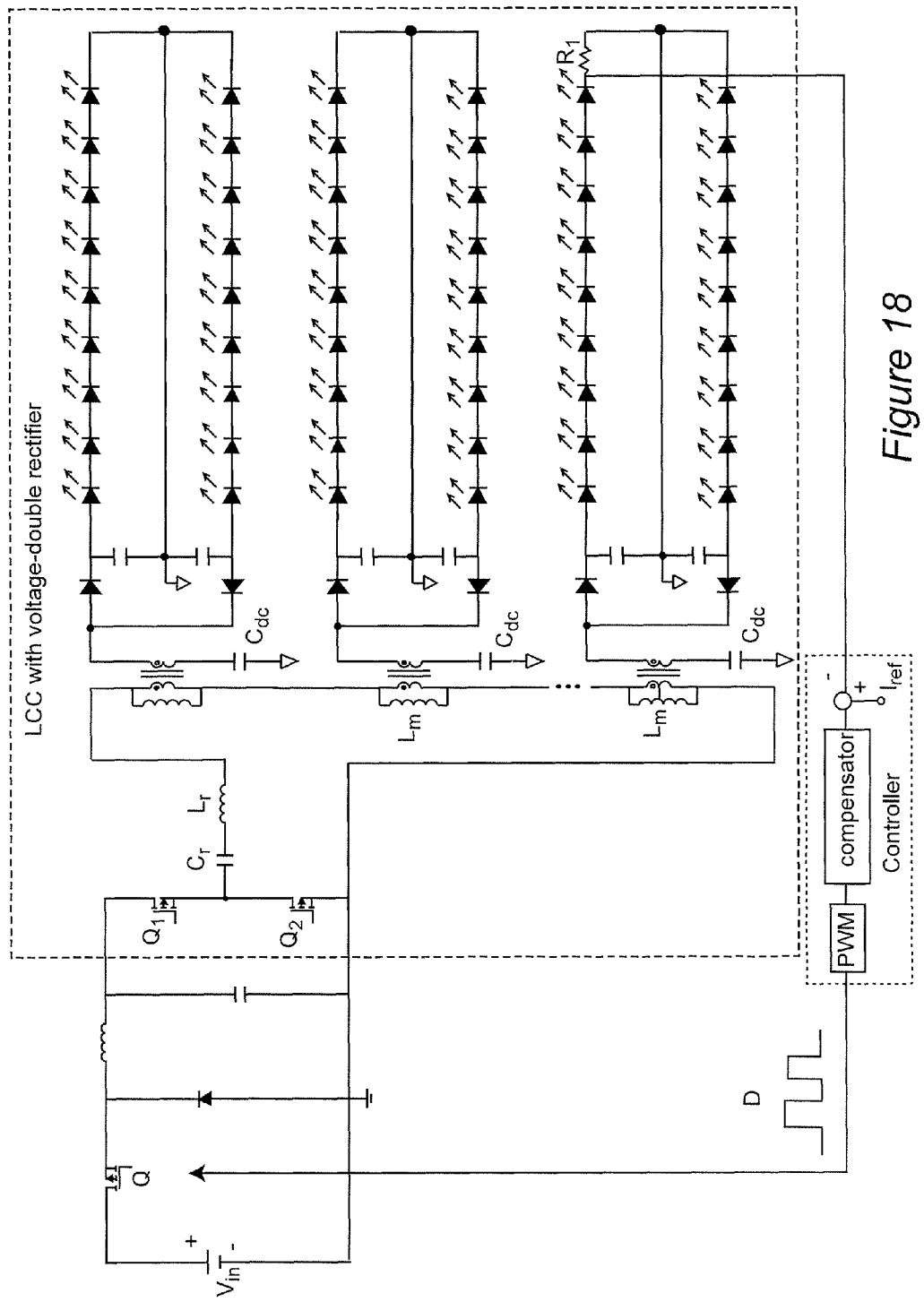
FIG. 18 illustrates an exemplary alternative second stage topology in accordance with the invention.

For example, as illustrated in FIG. 18, an LLC resonant converter with a voltage doubler rectifier can be used to drive two LED strings from each transformer. It should be noted that cross-regulation of current can be achieved while monitoring current in either of the LED strings in any channel and that only one additional capacitor (and reversal of polarity of one diode) is required in the voltage doubler rectifier while the number of required transformers is halved. Therefore, both manufacturing economies and potential increase of power density may be achieved with such a variant embodiment.

Figure 19:
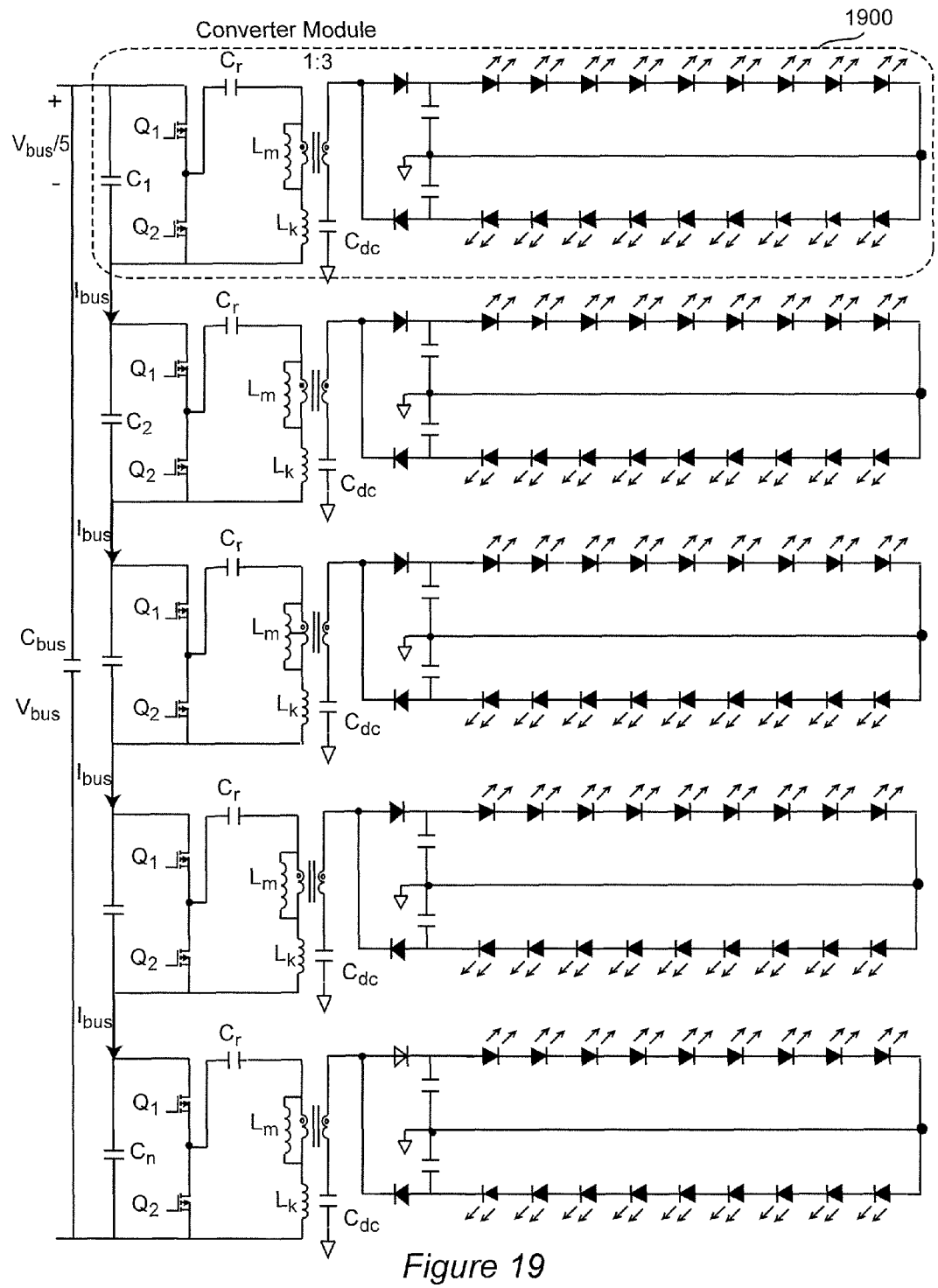
FIG. 19 is a schematic diagram of an alternative embodiment of the invention.

As a further example of alternative second stage topologies that may be advantageous in some applications, reference is now made to FIG. 19 which schematically illustrates a modular LED illumination arrangement. Compared with the embodiment of FIG. 18, for example, the output of the first stage (represented in FIG. 19 simply as an optional capacitor $C_{bus}$) is connected to a capacitive voltage divider comprised of a plurality of equal valued capacitors C1-Cn such that $V_{bus}$ is divided into a plurality of equal, lesser voltages. A switching circuit is connected across each of the plurality of capacitors and the output of each switching circuit is connected to a transformer providing, in turn, an output to a driver circuit (a voltage doubler driver circuit as discussed above in this example) and LED string(s). Resonant circuit elements (e.g. Cr, Lm and Lk) may be added to provide soft switching, if desired. Thus, the arrangement of FIG. 18, for example, can be divided into a plurality of substantially identical modules that can be connected to a DC voltage singly or in series to provide any level of illumination over an area of any size.

It should be noted that the switching circuits should be driven in synchronism at the same constant frequency. When this is done, the transformer primary windings are also connected in series when power is being delivered and all modules receive identical currents, $I_{bus}$. Thus, when a plurality of modules are connected in series, if the current in any LED string is regulated, the remainder of the LED strings can be cross-regulated, as well, as discussed above.

The modular construction provided by this embodiment allows much increased convenience of manufacture and flexibility of application. Increased efficiency is also provided by such a modular construction, as well, particularly in connection with first stage drivers that can provide a voltage either above or below the input voltage, such as the buck-boost topologies discussed above. For example, if five converter modules 1900 are used together, as illustrated in FIG. 19, the capacitor voltage divider formed by the inputs to the modules divides $V_{bus}$ by five and the voltage applied to each module is $V_{bus}/5$. Thus switches and other elements having reduced voltage ratings can be used; resulting in reduced cost of the individual elements that is generally larger than the cost of increased numbers of elements and also allows use of more nearly ideal circuit elements having better and more uniform electrical characteristics. For example, in the embodiment of FIG. 18, if $V_{bus}=300V$, switches Q1 and Q2 should have a 600V rating. Such devices have a $R_{ds\_on}$ resistance of about 100 mΩ. However in the embodiment of FIG. 19 and having the same $V_{bus}$ voltage, $V_{bus}/5=60V$ and switches having a 100V rating and a $R_{ds\_on}$ of about 15 mΩ can be used; resulting in significantly reduced conduction losses and improved efficiency particularly where the number of modules used together is small. It should also be appreciated that any reasonable number of modules can be driven by a buck-boost first stage converter such as those discussed above and which can automatically adjust $V_{bus}$ based on the number of modules being driven and the voltage appearing on any of the capacitors C1-Cn in the capacitive voltage divider. Other advantages of other alternative second stage topologies will be evident to those skilled in the art.

In view of the foregoing, it is clearly seen that the use of an additional converter stage to provide a variable regulated voltage input to a multi-channel constant current source allows that multi-channel current source to be operated at a constant and preferably optimal frequency to maintain optimal efficiency even when the constant current is controllable over a very wide range, such as for emulating dimming of incandescent light sources using LEDs for illumination.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A multi-channel constant current source having a plurality of channels comprising
    a power source stage providing a controllable regulated output voltage, said regulated output voltage being controllable by pulse width modulation at a first frequency, and,
    a channel driver stage comprising
    a switching circuit connected to said output of said power source,
    a plurality of transformers equal in number to the number of channels and having primary windings connected to receive equal currents from said switching circuit, said transformers having magnetizing inductances and turns ratios which are substantially equal, and
    a plurality of constant current channel drivers equal in number to the number of channels, wherein said constant current channel drivers are operated at a second constant frequency and connected to a secondary winding of a respective one of said plurality of transformers.

2. A multi-channel constant current source as recited in claim 1, wherein said power source stage comprised a buck topology voltage regulator circuit.

3. A multi-channel constant current source as recited in claim 1, wherein said power source stage comprised a boost topology voltage regulator circuit.

4. A multi-channel constant current source as recited in claim 1, wherein said power source stage comprised a buck-boost topology voltage regulator circuit.

5. A multi-channel constant current source as recited in claim 4 wherein said buck-boost voltage regulator circuit is an inverting buck-boost converter.

6. A multi-channel constant current source as recited in claim 4 wherein said buck-boost voltage regulator circuit is a non-inverting buck-boost converter.

7. A multi-channel constant current source as recited in claim 4 wherein said buck-boost voltage regulator circuit is a four-switch buck-boost converter.

8. A multi-channel constant current source as recited in claim 1, wherein said switching circuit comprise a buck topology constant current sources.

9. A multi-channel constant current source as recited in claim 1, wherein said switching circuit includes a voltage doubler rectifier.

10. A multi-channel constant current source as recited in claim 1, wherein said power source stage includes a capacitive voltage divider having a number of capacitors equal in number to said number of channels.

11. A multi-channel illumination apparatus having a plurality of channels comprising
    a power source stage providing a controllable regulated output voltage, said regulated output voltage being controllable by pulse width modulation at a first frequency, and,
    a channel driver stage comprising
    a switching circuit connected to said output of said power source,
    a plurality of transformers equal in number to the number of channels and having primary windings connected to receive equal currents from said switching circuit, said transformers having magnetizing inductances and turns ratios which are substantially equal,
    a plurality of constant current channel drivers equal in number to the number of channels, wherein said constant current channel drivers are operated at a second constant frequency and connected to a secondary winding of a respective one of said plurality of transformers, and
    at least one series-connected string of light-emitting diodes connected to each constant current channel driver of said plurality of constant current channel drivers.

12. A multi-channel illumination apparatus as recited in claim 11, wherein said power source stage comprised a buck topology voltage regulator circuit.

13. A multi-channel illumination apparatus as recited in claim 11, wherein said power source stage comprised a boost topology voltage regulator circuit.

14. A multi-channel illumination apparatus as recited in claim 11, wherein said power source stage comprised a buck-boost topology voltage regulator circuit.

15. A multi-channel illumination apparatus as recited in claim 1 wherein said buck-boost voltage regulator circuit is an inverting buck-boost converter.

16. A multi-channel illumination apparatus as recited in claim 14 wherein said buck-boost voltage regulator circuit is a non-inverting buck-boost converter.

17. A multi-channel illumination apparatus as recited in claim 14 wherein said buck-boost voltage regulator circuit is a four-switch buck-boost converter.

18. A multi-channel illumination apparatus as recited in claim 11, wherein said switching circuit comprise a buck topology constant current sources.

19. A multi-channel illumination apparatus as recited in claim 11, wherein said switching circuit includes a voltage doubler rectifier.

20. A multi-channel illumination apparatus as recited in claim 11, wherein said power source stage includes a capacitive voltage divider having a number of capacitors equal in number to said number of channels.

21. A multi-channel illumination apparatus as recited in claim 11, wherein said plurality of constant current drivers are pulse-width modulated.

* * * * *